United States Patent

Meininger et al.

[11] 4,046,754
[45] Sept. 6, 1977

[54] WATER-SOLUBLE NAPHYHYL-AZO-PYRAZOLONE FIBER REACTIVE DYESTUFFS

[75] Inventors: Fritz Meininger; Hartmut Springer, both of Frankfurt am Main, Germany

[73] Assignee: Hoechst Aktiengesellschaft, Frankfurt am Main, Germany

[21] Appl. No.: 623,339

[22] Filed: Oct. 17, 1975

Related U.S. Application Data

[60] Continuation-in-part of Ser. No. 449,517, March 8, 1974, abandoned, which is a continuation of Ser. No. 261,925, June 12, 1972, abandoned, which is a division of Ser. No. 66,552, Aug. 24, 1970, abandoned.

[30] Foreign Application Priority Data

Mar. 11, 1971 Germany .............................. 1943904

[51] Int. Cl.² .......................... C09B 29/38; C09B 43/18
[52] U.S. Cl. ...................................... 260/162; 260/153; 260/155; 260/193; 260/194; 260/195; 260/196
[58] Field of Search ........................................ 260/162

[56] References Cited

U.S. PATENT DOCUMENTS

| 3,114,746 | 12/1963 | Benz et al. ............... 260/162 X |
| 3,135,730 | 6/1964 | Heyna et al. ............... 260/162 X |
| 3,346,553 | 10/1967 | Kuhne et al. ............... 260/162 X |
| 3,406,163 | 10/1968 | Meininger et al. ............... 260/162 |
| 3,419,541 | 12/1968 | Kuhne et al. ............... 260/162 |
| 3,426,008 | 2/1969 | Meininger et al. ............... 260/162 X |
| 3,462,409 | 8/1969 | Meininger ............... 260/162 X |
| 3,655,642 | 4/1972 | Meininger et al. ............... 260/162 X |

*Primary Examiner*—Charles F. Warren
*Attorney, Agent, or Firm*—Curtis, Morris & Safford

[57] ABSTRACT

A water-soluble monoazo dyestuff having in form of the free acid the formula

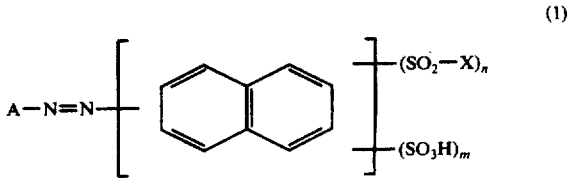

(1)

wherein A represents the radical of a coupling component of the pyrazolone series, X represents the grouping —CH=CH₂ or —CH₂—CH₂—Z, in which Z stands for a hydroxy group or an inorganic or organic radical capable of being split off by an alkaline agent, and m and n each represent the integer 1 or 2, said dyestuffs being highly suitable for the dyeing or printing of leather or textile materials consisting of wool, silk, polyamides, native or regenerated cellulose and yielding on cellulose fibrous materials in the presence of alkaline agents bright dyeings or prints of good to very good fastness to light and wet processing and of good resistance to alkaline agents.

7 Claims, No Drawings

WATER-SOLUBLE NAPHYHYL-AZO-PYRAZOLONE FIBER REACTIVE DYESTUFFS

This application is a continuation-in-part application of U.S. patent application Ser. No. 449,517, filed Mar. 8, 1974, now abandoned, which is a continuation application of U.S. patent application Ser. No. 261,925 filed June 12, 1972, now abandoned, which again is a divisional application of U.S. patent application Ser. No. 66,552, filed Aug. 24, 1970, now abandoned.

The present invention concerns new, water-soluble monoazo dyestuffs, which correspond in form of the free acids to the general formula

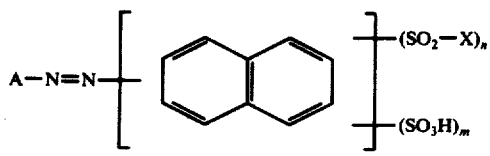

(1)

wherein A stands for the radical of a coupling component of the benzene, naphthalene, acetoacetic acid aryl amid, pyrazolone or quinoline series, X represents the grouping $-CH_2-CH_2-Z$ or $-CH=CH_2$, wherein Z stands for a hydroxyl group or an inorganic or organic radical capable of being split off by means of an alkali, and $m$ and $n$ stand for the numbers 1 or 2, and a process for their preparation.

As inorganic or organic radicals Z capable of being split off, there may be mentioned for example:

A halogen atom, preferably a chlorine or bromine atom, an alkyl or arylsulfonic acid group, an acyloxy group such as the acetoxy group, furthermore a phenoxy group, a dialkylamino group such as a dimethyl or diethylamino group, moreover the thiosulfuric acid ester group, the phosphoric acid ester group and especially the sulfuric acid ester group.

The new monoazo dyestuffs having the above mentioned general formula (1) may be prepared by diazotizing naphthylamines of the general formula (2)

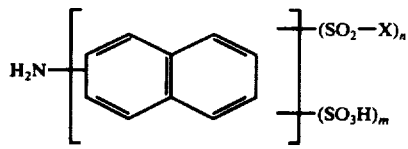

(2)

wherein X, $m$ and $n$ are defined as above, following usual methods, for example with sodium nitrite and mineral acid, by coupling with coupling components of the general formula (3)

H — A  (3)

wherein A is defined as above, in an aqueous medium and optionally by converting subsequently the obtained dyestuffs of formula (1), wherein X stands for the grouping $-CH_2-CH_2-OH$, according to known methods into dyestuffs of the formula (1), wherein X represents the grouping $-CH_2-CH_2-Z$ or $-CH=CH_2$, wherein Z represents an inorganic or organic radical capable of being split off by means of an alkali.

The conversion of dyestuffs of the general formula (1), in which X stands for the grouping $-CH_2-CH_2-OH$, into dyestuffs of the formula (1), wherein X represents the grouping $CH_2-CH_2-OSO_3H$, is carried out in known manner by using sulphating agents, such as concentrated sulfuric acid, chlorosulfonic acid, amidosulfonic acid or sulfurtrioxide yielding agents.

For converting dyestuffs of the general formula (1), wherein X stands for the group $-CH_2-CH_2-OH$, into dyestuffs of the formula (1), wherein X stands for the grouping $-CH_2-CH_2-OPO_3H_2$, there may serve in known manner phosphorylating agents such as for instance concentrated phosphoric acid, pyrophosphoric acid, metaphorphoric acid, polyphosphoric acid, polyphosphoric acid alkyl ester, mixtures of phosphoric acid and phosphorus pentoxide or phosphoroxy chloride.

Dyestuffs of the general formula (1), in which Z stands for an alkyl sulfonic acid ester group or an aryl sulfonic acid ester group or an acyloxy group, may be obtained from dyestuffs of formula (1), wherein Z stands for a hydroxyl group, for instance by reaction, in known manner, with alkyl or aryl sulfonic acid chlorides, such as methane sulfonic acid chloride or p-toluene-sulfonic acid chloride or with carboxylic acid chloride, such as acetyl chloride or 3-sulfobenzoyl chloride.

Dyestuffs of the general formula (1), wherein X stands for the group $-CH_2-CH_2-Z$, are prepared in known manner from dyestuffs of the formula (1), in which X stands for the group $-CH_2-CH_2-Z$, by reaction with alkaline agents, for example sodium carbonate or sodium hydroxide.

Dyestuffs of the general formula (1), wherein Z stands for a thiosulfuric acid ester group or a dialkylamino group are prepared in known manner from dyestuffs of the formula (1), in which X stands for the group $-CH=CH_2$, by reaction with salts of the thiosulfuric acid, as for instance, sodium thiosulfate or by reaction with dialkylamines, such as diethylamines.

The following compounds may be used for example as coupling components H—A:

Acetacetic acid arylide, pyrazolones, especially 5-pyrazolones, which couple in 4-position, such as 3-methyl-5-pyrazolone, 1-phenyl-3-methyl-5-pyrazolone, 1-(2'-,3'- or 4'-sulfophenyl)-3-methyl-5-pyrazolone, 1-phenyl-5-pyrazolone-3-carboxylic acid, 5-pyrazlone-3-carboxylic acid ester and -amide, 1-(6'-chloro-2'-methyl-4'-sulfophenyl)-3-methyl-5-pyrazolone, furthermore phenols and hydroxyl aninolines, as for example 8-hydroxy-aninolines such as 8-hydroxy quinolinesulfonic acids, salicyl acid, α-or β-naphthols, α-or β-naphthylamines, especially naphthol sulfonic acids, aminonaphthol sulfonic acids, acylamino naphthol sulfonic acids, which may equally contain reactive groups, for example a β-sulfatoethyl-sulfonyl radical, an acryloylamino-2,6-dichloro-s-triazinyl-amino radical or a 2-chloro-6-amino-s-triazinylamino radical, moreover 2,3-oxynaphthoic acid and 2,3-hydroxynaphthoic acid arylide.

The naphthylamines used for the preparation of the new monoazo-dyestuffs and having the general formula (2), wherein X stands for the group $-CH_2-CH_2-OH$, may be prepared, for instance, by converting acetaminonaphthalene sulfinic acids by means of ethylene-oxide or β-chloro-ethanol into acetamino(β-hydroxy-ethyl-sulfonyl)-naphthalenes and by sulfonating and diacetylating these ones, the order of succession of the two last steps depending on circumstances. As examples for naphthylamines prepared in this way, having the formula (2), wherein X stands for the group —CH₂—CH₂—OH, there may be mentioned:

1-amino-6-(β-hydroxy-ethyl sulfonyl)-naphthalene-4-sulfonic acid,
1-amino-5-(β-hydroxy-ethyl sulfonyl)-naphthalene-7-sulfonic acid,
1-amino-7-(β-hydroxy-ethyl sulfonyl)-naphthalene-4-sulfonic acid,
2-amino-6-(β-hydroxy-ethyl sulfonyl)-naphthalene-8-sulfonic acid,
2-amino-8-(β-hydroxy-ethyl sulfonyl)-naphthalene-6-sulfonic acid,
2-amino-6,8-bis(β-hydroxy-ethyl-sulfonyl)-naphthalene-3-sulfonic acid and 2-amino-5-(β-hydroxy-ethylsulfonyl)-naphthalene-1,7-disulfonic acid.

Naphthylamines of the general formula (2), wherein X stands for the group —CH₂—CH₂—OH, may be converted in known manner into those naphthylamines of the general formula (2), wherein X either represents the group —CH₂—CH₂—Z, in which Z represents an inorganic or organic radical capable of being split off by means of an alkaline agent, or stands for the group —CH=CH₂, and which may equally be used as starting material for the preparation of the new monoazo dyestuffs.

The monoazo dyestuffs obtained according to the described process, can be isolated by salting out, for example with sodium or potassium chloride or by spray drying of the preparation mixture.

The novel dyestuffs are very suitable for the dyeing and printing of different fibrous materials such as wool, silk, leather and polyamide fibrous materials, especially natural or regenerated cellulose fibrous materials, as for example cotton, spun rayon and linen. They may preferably be used for reactive dyestuffs according to the dyeing and printing processes generally used in industry, and they yield for example on cellulose fibrous materials, in the presence of alkaline agents, as well as on wool bright dyeings and prints of good to very good fastness to light in the dry and wet state, to wet processings such as to alkali, to acid, to water, to sea-water, to washing at a temperature of 30° to 100° C, such as 60° or 95° C, also to washing in the presence of sodium perborate or sodium hypochlorite, to bleaching such as by hypochlorite or peroxide, to alkaline and acid perspiration, to acid and alkaline milling, felting or fulling, to acid or alkalines cross-dyeing, to chlorinated water to decatizing, carbonizing and to mercerizing, furthermore good fastnesses to steaming, ironing, rubbing, to the action of solvents and to copper.

Also there must be mentioned especially their good stability in neutral and alkaline dyeing and padding liquors, the high tinctorial strength and fixation quote and the very good build-up capacity of the new dyestuffs when used as dyeing and printing dyestuffs for cotton.

The monoazo dyestuffs obtainable according to the present invention are superior to the next comparable dyestuffs known from the German Pat. Nos. 965,902 and 960,534, as concerns solubility and resistance of alkaline printing pastes and dyebaths; and they are superior to the next comparable dyestuffs described in the Belgian Pat. Nos. 697,952, 737,940, 738,101, 738,292 and 741,647, as concerns color build-up (ratio between dyestuff concentration in the dyeing bath and obtained tinctorial strength on the dyed fibrous material) according to the dyeing and printing process.

The following examples serve to illustrate the invention. Parts and percentages are by weight unless otherwise stated.

EXAMPLE 1

33.1 Parts of 1-amino-5-(β-hydroxyethylsulfonyl)-naphthalene-7-sulfonic acid were introduced at 10° - 20° C into 60 parts of concentrated sulfuric acid and stirred overnight at room temperature. The resulting clear solution was introduced while stirring into about 750 parts of icewater, so that the temperature did not exceed 10° C. The precipitated sulfuric acid ester was filtered and dissolved in 300 parts of water by addition of saturated sodium carbonate solution, until the reaction was neutral. After addition of 20 parts by volume of 5N sodium nitrite solution, this solution was stirred in a mixture containing 150 parts of ice and 35.5 parts of a 37% hydrochloric acid, so that the temperature did not exceed 15° C. Stirring was continued for ½ hour, then an excess, of nitrous acid, if any, is destroyed by means of amidosulfonic acid, a solution of 40 parts of 2-acetamino-5-naphthol-7-sulfonic acid (70.6%) in 200 parts of water was added thereto, and the pH-value adjusted to 6 with saturated sodium hyroxide solution. At this pH-value stirring was continued until the end of the coupling reaction, optionally by further addition of sodium hydroxide solution. The resulting dyestuff was salted out with potassium chloride, filtered and dried.

78 Parts of a saliferous dyestuff were obtained which dissolved easily in water with a red color and corresponded, in form of the free acid, to the formula

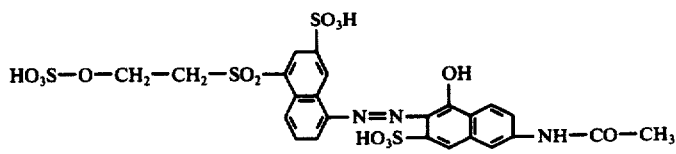

In the presence of alkaline compounds such as sodium hydrogenocarbonate, sodium carbonate or sodium hydroxide solution, the dyestuffs yielded on cotton fabrics brilliant red dyeings and prints very fast to washing and to the action of light.

Dyestuffs with similar dyeing properties were obtained, when in the above example the 1-amino-5-(β-hydroxyethylsulfonyl)-naphthalene-7-sulfonic acid was substituted by equivalent amounts of the naphthyl amines of the formula (2) listed in the following Table and when the 2-acetamino-5-naphthol-7-sulfonic acid was replaced by equivalent amounts of the coupling components equally mentioned in the following Table.

| Naphthylamine of the formula (2) | Coupling component | Shades |
|---|---|---|
| 1-amino-5-(β-hydroxyethylsulfonyl)-naphthalene-7-sulfonic acid | 1-benzoylamino-8-naphthol-3,6-disulfonic acid | bluish red |

-continued

| Naphthylamine of the formula (2) | Coupling component | Shades |
|---|---|---|
| 1-amino-7-(β-hydroxyethylsulfonyl)-naphthalene-4-sulfonic acid | " | red violet |
| " | 1-benzoylamino-8-naphthol-4,6-disulfonic acid | bluish red |
| 2-amino-8-(β-hydroxyethylsulfonyl)-naphthalene-6-sulfonic acid | " | bluish red |
| " | 1-benzoylamino-8-naphthol-3,6-disulfonic acid | bluish red |
| " | 1-acetylamino-8-naphthol-3,6-disulfonic acid | bluish red |
| " | 2-acetylamino-8-naphthol-6-sulfonic acid | yellowish red |
| " | 2-acetylamino-5-naphthol-7-sulfonic acid | reddish orange |
| " | 2-acetylamino-5-naphthol-1,7-disulfonic acid | reddish orange |
| " | 1-acryloylamino-8-naphthol-4,6-disulfonic acid | bluish red |
| " | 1-(2',4'-dichlorotriazinyl-(6)-amino)-8-naphthol-3,6-disulfonic acid | bluish red |
| " | 1-acetylamino-5-naphthol-7-sulfonic acid | red |
| " | 1-aminonaphthalene-4-sulfonic acid | Red |
| " | 2-aminonaphthalene-5,7-disulfonic acid | reddish orange |
| " | 1-amino-8-naphthol-2,4-disulfonic acid | violet |
| 2-amino-8-(β-hydroxyethylsulfonyl)-naphthalene-6-sulfonic acid | 1-naphthol-4-sulfonic acid | yellowish red |
| " | 1-naphthol-5-sulfonic acid | red |
| " | 1-naphthol-3,6-disulfonic acid | red |
| " | 2-hydroxy-naphthalene-3-carboxylic acid-(2'-methoxy-phenyl-1')-amide | red |
| " | 2-hydroxy-naphthalene-3-carboxylic (2',4'-dimethoxy-5'-chloro-phenyl-1')-amide | bluish red |
| " | 1-(4'-sulfophenyl)-3-methyl-5-pyrazolone | yellow |
| " | 1-(4'-sulfophenyl)-3-carboxy-5-pyrazolone | reddish yellow |
| " | 1-(2',5'-dichloro-4'-sulfophenyl)-3-methyl-5-pyrazolone | yellow |
| " | 1-(4',8'-disulfonaphthyl-2')-3-methyl-5-pyrazolone | yellow |
| " | 1-acetoacetylamino-3-methyl-6-methoxybenzene-4-sulfonic acid | greenish yellow |
| " | 1-(4'-sulfophenyl)-3-carbethoxy-5-pyrazolone | reddish yellow |
| " | 1,8-dihydroxynaphthalene-3,6-disulfonic acid | red |
| 2-amino-6,8-bis-(β-hydroxyethylsulfonyl)-naphthalene-3-sulfonic acid | 1-benzoylamino-8-naphthol-3,6-disulfonic acid | bluish red |
| 2-amino-5-(β-hydroxyethylsulfonyl)-naphthalene-1,7-disulfonic acid | " | bluish red |
| 1-amino-6-(β-hydroxyethylsulfonyl)-naphthalene-4-sulfonic acid | 1-benzoylamino-8-naphthol-4,6-disulfonic acid | bordo |

EXAMPLE 2

33.1 Parts of 1-amino-5-(β-hydroxyethylsulfonyl)-naphthalene-7-sulfonic acid were dissolved until neutral in 500 parts of water by addition of saturated sodium carbonate solution. 20 Parts by volume of 5N-sodium nitrite solution were added thereto and the solution was stirred into a mixture of 150 parts of ice and 35.5 parts of a 37% hydrochloric acid, so that the temperature did not exceed 15°. Stirring was continued for one-half hour, an optionally present nitrous acid excess was destroyed with amidosulfonic acid, a solution of 30.4 parts of 1-naphthol-3,6-sulfonic acid in 200 parts of water was added, and pH was adjusted to 6 with saturated sodium hydroxide solution. At this pH-value it was stirred, until the coupling reaction was complete, optionally by further addition of sodium carbonate solution. Then the resulting dyestuff was salted out by means of potassium chloride, filtered and dried. It dissolved easily in water and corresponded in form of the free acid to the formula

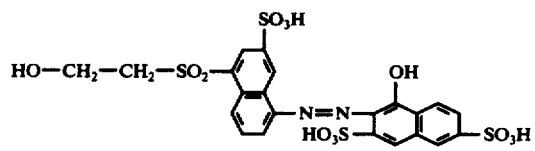

When printed and subsequently thermofixed on cotton, the dyestuff yielded in the presence of alkaline agents a red print fast to washing and to light.

Dyestuffs with similar properties were obtained when in the aforementioned example the 1-amino-7-(β-hydroxyethylsulfonyl)-naphthalene-4-sulfonic acid was replaced by equivalent amounts of the naphtyylamines of formula (2) listed in the table at the end of Example 1.

EXAMPLE 3

64.6 Parts of the dyestuff prepared following the Example 2, were introduced into 185 parts of concentrated sulfuric acid and stirred until complete dissolution. The resulting solution was stirred into a mixture of 450 parts of ice and 50 parts of water, and the resulting ester dyestuff was salted out by means of potassium chloride. Then it was filtered, dissolved in 300 parts of water by addition of sodium hydrogenocarbonate until a pH-value of 5.5, and the obtained solution was evaporated until dryness.

The obtained dyestuff showed a very good solubility in water, and was suitable for printing, especially for dyeing. Thus, by applying saliferous dyebaths in the cold or in the heat on native or regenerated cellulose fibres by means of alkalis, bright red dyeings were obtained, exhibiting good to very good fastnesses to wet processing and to light.

The dyestuff corresponded in form of the free acid to the formula

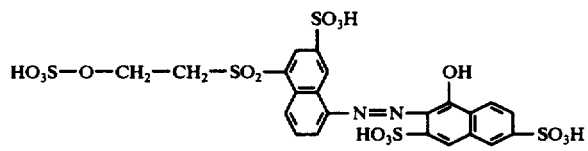

EXAMPLE 4

72.6 Parts of the dyestuff prepared according to Examples 3, were dissolved in 500 parts of water. At 20° to 25° C, 7.5 parts of diethylamine, then slowly about 30 parts of a 33% sodium hydroxide solution were added, until the pH-value was adjusted to 12.0–12.5 and stirring was continued for 16 hours at 20° to 25° C. Subsequently, the pH-value of the reaction mixture was adjusted to 7.8 – 8.3 by addition of about 35 parts of a 20% hydrochloric acid, the dyestuff was completely precipitated by salting out with sodium chloride, filtered, washed with sodium chloride solution and dried.

The so-obtained dyestuff corresponded to the formula

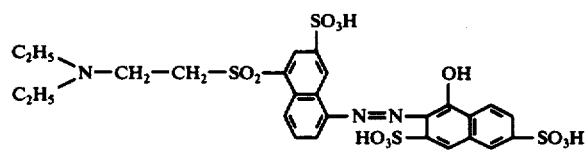

It was water-soluble having a red color and was eminently suitable for the printing of cotton fabrics, providing in the presence of alkaline agents bright red prints with excellent fastness properties. The resistance of alkaline printing pastes of this dyestuff was very good.

EXAMPLE 5

36.3 Parts of the dyestuff prepared following Example 3 were dissolved in 350 parts of water. About 30 parts of a 33% sodium hydroxide solution were added slowly to this solution at 25° to 30° C, until the pH-value 12.0 to 12.5 was attained and maintained. Stirring was continued for a short time, the solution was rendered neutral by addition of a hydrochloric acid, and the dyestuff was isolated by salting out with sodium chloride.

The obtained dyestuff corresponded in form of the free acid to the formula

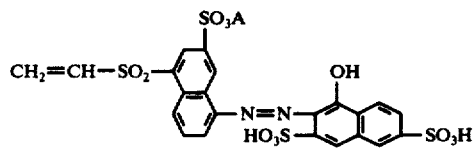

It was eminently suitable for the dyeing or printing of cotton fabrics, where it yielded in the presence of alkaline agents red dyeings and prints of very good fastnesses to washing and to light.

In contradistinction to the dyestuff of next comparable constitution, known from German Pat. No. 960,534, Example 4, the present dyestuff showed a better solubility in water and better fastness of alkaline printing pastes and dyebaths.

EXAMPLE 6

31.4 Parts of the vinylsulfonyl dyestuff prepared following Example 5 were introduced into 300 parts of water. The solution was heated to 70° – 75° C and mixed at this temperature with 23.5 parts of sodium thiosulfate containing crystal water. The pH-value was adjusted to 5.7 – 6.2 by addition of a 50% acetic acid and maintained at this level for 3 hours by adding some more acid.

When the reaction was complete, the dyestuff was precipitated by addition of sodium chloride, filtered and dried. 48 Parts of the saliferous dyestuff of the formula

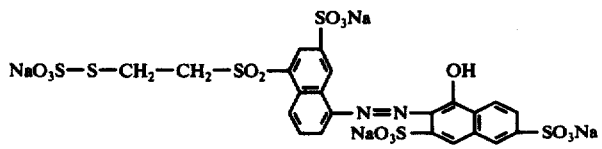

were obtained, which dissolved easily in water with a red color and could serve for the dyeing and printing of cellulose textile materials in the presence of alkaline agents.

The obtained dyeings and prints were fast to washing and to light.

EXAMPLE 7

A solution of 41.1 parts of 2-amino-8-(β-phosphatoethylsulfonyl)-naphthalene-6-sulfonic acid in 300 parts of water, being rendered neutral by addition of saturated sodium carbonate solution, was mixed with 20 parts by volume of 5 N-sodium nitrite solution and then slowly stirred into a mixture of 150 parts of ice and 36 parts of a 37% hydrochloric acid, so that the temperature did not exceed 15° C. Stirring was continued for one-half hour, an optionally present nitrous acid excess was destroyed by addition of amidosulfonic acid, 64.2 parts of 1-benzoylamino-8-naphthol-3,6-disulphonic acid (66%) were added thereto, and the pH-value was adjusted to 6 by adding dropwise about 50 parts of saturated sodium hydroxide solution. When the coupling reaction was complete, the obtained dyestuff solution was evaporated until dry.

The so prepared dyestuff had the following formula (in form of its free acid):

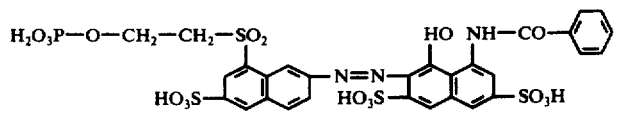

It dissolved in water with a bluish red color and yielded on cotton in the presence of alkaline agents a bright bluish red dyeing of good fastness to light and to washing.

The monoazo dyestuffs listed in the following Table were prepared in a similar way, as described in the before example and yielded dyeings and prints on cotton, which equally distinguished themselves by good to very good fasteness properties.

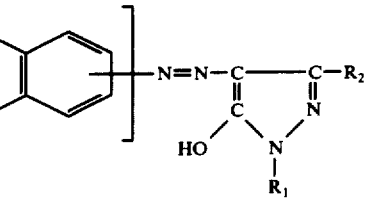

wherein X is —CH=CH$_2$ or —CH$_2$—CH$_2$—Z in which is —OH, —Cl, —Br, —OSO$_3$H, —SSO$_3$H, —OPO$_3$H$_2$,

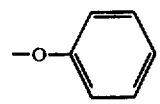

or —N(lower alkyl)$_2$, R$_1$ is phenyl or naphthyl substituted by at least one member of the group sulfo and

| Naphtylamine of the formula (2) | Coupling component | Shade |
|---|---|---|
| 2-amino-3-($\beta$-diethylamino-ethyl-sulfonyl)-naphthalene-6-sulfonic acid | 2-acetylamino-8-naphthol-6-sulfonic acid | yellowish red |
| 2-amino-8-($\beta$-thiosulfato-ethyl-sulfonyl)-naphthalene-6-sulfonic acid | 1-naphthol-4-sulfonic acid | yellowish red |
| 2-amino-8-($\beta$-chloroethyl-sulfonyl)-naphthalene-6-sulfonic acid | 1-naphthol-5-sulfonic acid | red |
| 2-amino-8-($\beta$-acetoxy-ethylsulfonyl)-naphthalene-6-sulfonic acid | 1-acetylamino-8-naphthol-3,6-disulfonic acid | bluish red |
| 2-amino-8-($\beta$-bromoethyl-sulfonyl)-naphthalene-6-sulfonic acid | 2-acetylamino-5-naphthol-1,7-disulfonic acid | reddish orange |
| 2-amino-8-($\beta$-phenoxyethyl-sulfonyl)-naphthalene-6-sulfonic acid | 1-benzoylamino-8-naphthol-4,6-disulfonic acid | bluish red |
| 2-amino-8-($\beta$-hydroxyethylsulfonyl)-naphthalene-6-sulfonic acid, methylsulfonic acid ester | 1-(4'-sulfophenyl)-3-methyl-5-pyrazolone | reddish yellow |
| 2-amino-8-($\beta$-hydroxyethylsulfonyl)-naphthalene-6-sulfonic acid, p-toluenesulfonic acid ester | 1-(4'-sulfophenyl)-3-carboxy-5-pyrazolone | reddish yellow |
| 1-amino-5-($\beta$-sulfatoethylsulfonyl)-naphthalene-7-sulfonic acid | 3-amino-toluene | reddish yellow |
| " | phenole | yellow |
| " | salicyl acid | reddish yellow |
| " | Resorcine | yellow brown |
| " | 3-methyl-N,N-diethylaniline | orange |
| " | 8-hydroxychinoline | orange |
| " | 1-(2'-chloro-4'-aminotriazinyl-(6)-amino)-8-naphthol-disulfonic acid | bluish red |
| " | 1-(2',4'-dihydroxy-triazinyl-(6)-amino)-8-naphthol-3,6-disulfonic acid | bluish red |

We claim:

1. A water-soluble monoazo dyestuff having in the form of the free acid the formula halo, R$_2$ is lower alkyl, carboxyl or carboxylic acid lower alkylester and m is 1 or 2.

2. A water-soluble monoazo dyestuff according to claim 1, wherein R$_1$ is monosulfophenyl, dichloromonosulfophenyl or disulfonaphthyl.

3. A water-soluble monoazo dyestuff according to claim 1, wherein R$_1$ is 4-sulfophenyl and R$_2$ is methyl.

4. A water-soluble monoazo dyestuff according to claim 1, wherein R$_1$ is sulfophenyl and R$_2$ is carboxyl.

5. A water-soluble monoazo dyestuff according to claim 1, wherein R$_1$ is 4-sulfophenyl and R$_2$ is carbethoxy.

6. A water-soluble monoazo dyestuff according to claim 1, wherein R$_1$ is 2,5-dichloro-4-sulfophenyl and R$_2$ is methyl.

7. A water-soluble monoazo dyestuff according to claim 1, wherein R$_1$ is 4,8-disulfonaphtyl-2- and R$_2$ is methyl.

* * * * *